Feb. 19, 1935.  C. B. SPASE  1,991,709
CLUTCH
Filed March 10, 1928  2 Sheets-Sheet 1
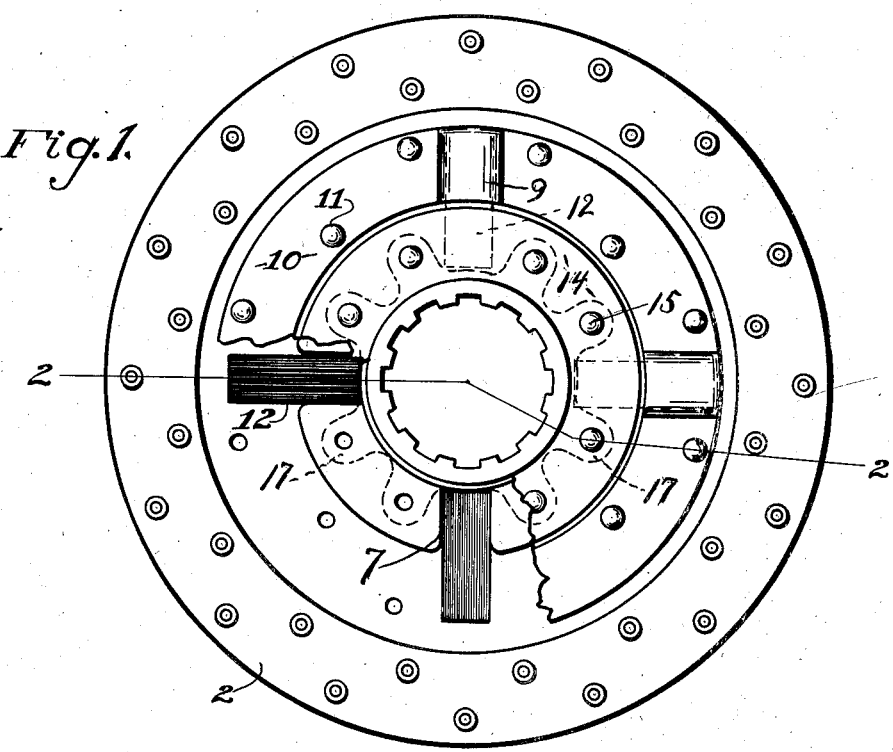
Fig.1.
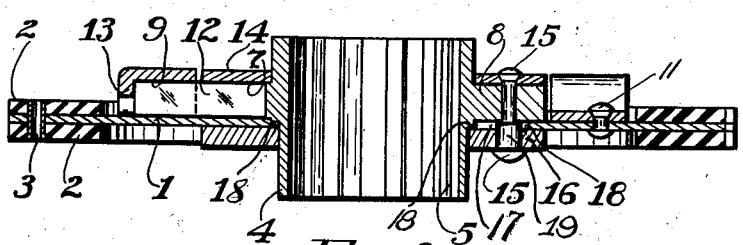
Fig.2.
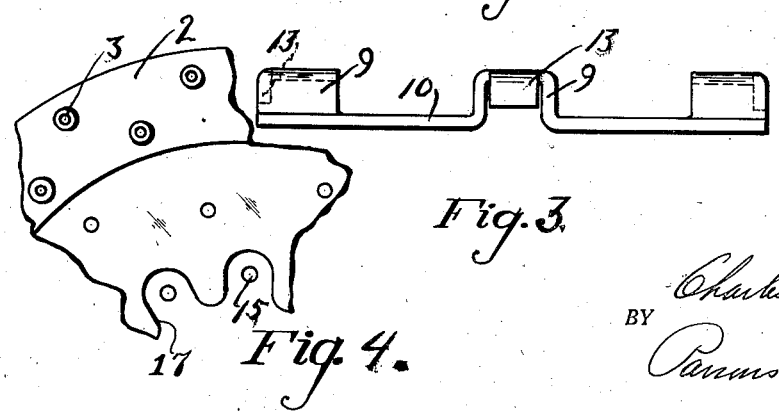
Fig.3.
Fig.4.
INVENTOR.
Charles B Spase
BY
Parmus Rodell
ATTORNEY.

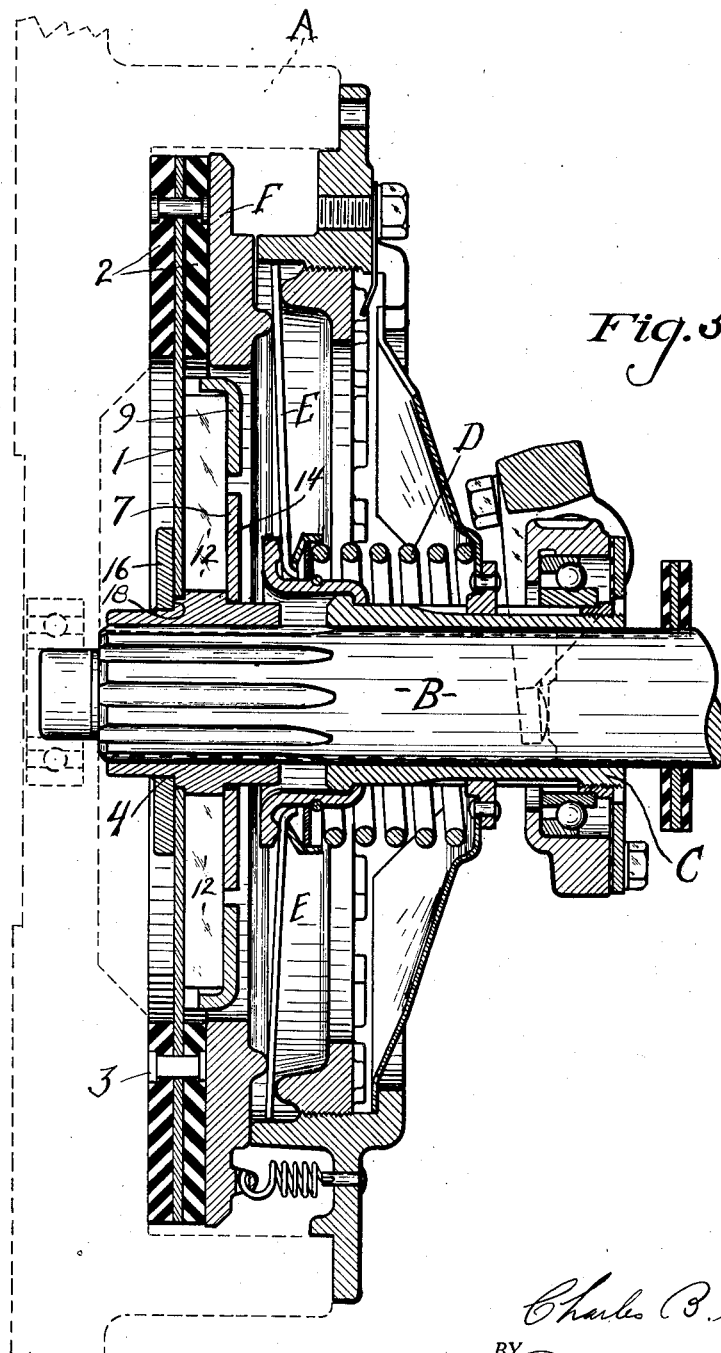

Patented Feb. 19, 1935

1,991,709

UNITED STATES PATENT OFFICE 1,991,709

CLUTCH

Charles B. Spase, Syracuse, N. Y., assignor to Brown-Lipe Gear Company, Syracuse, N. Y., a corporation of New York Application March 10, 1928, Serial No. 260,591

13 Claims. (Cl. 192—68)

This invention relates to friction clutches such as are used in motor vehicles and has for its object a clutch member or section embodying a particularly simple and efficient resilient means through which the torque is transmitted, and also a particularly simple, economical, compact and durable construction of such clutch member.

The invention consists in the novel features and constructions and combinations hereinafter set forth and claimed.

In describing this invention reference is had to the accompanying drawings in which like characters designate corresponding parts in all the views.

Figure 1 is a rear elevation, partly broken away, of this clutch member.

Figure 2 is a sectional view on line 2—2, Figure 1.

Figure 3 is an edge view of the detached socket member associated with the plate or web of the clutch member.

Figure 4 is a fragmentary elevation of the plate member.

Figure 5 is a vertical sectional view of a complete clutch embodying this clutch member.

This clutch member comprises generally a hub, a disk plate or web mounted on the hub and capable of limited angular movement or movement about the hub and resilient means interposed between the plate and hub to transmit the torque from one to the other.

I have here shown my invention as embodied in the driven member of a single plate clutch, that is, in the single plate member of a clutch.

1 designates the plate, disk or web having friction rings 2 on opposite sides of its outer margin, the friction rings being secured to the plate or disk 1 by rivets 3.

4 is the hub, this being mounted on the clutch shaft in any well known manner, which shaft is usually the stem of a stem gear of a transmission gearing. The hub is here shown as provided with integral splines 5 for interfitting with complemental splines on the clutch shaft. The hub and parts carried thereby are shiftable axially to engage and disengage the clutch by any suitable throw-out mechanism, the clutch spring acting against the throw-out mechanism to hold the clutch engaged.

The hub 4 is provided with angularly spaced open recesses or sockets opening outwardly, and the disk or plate 1 is provided with recesses or sockets opening inwardly and alined with the recesses in the hub. Spring or resilient means are located in the alined sockets or recesses for transmitting the torque from the disk 1 to the hub 4 or from the hub 4 to the plate 1. These spring means are here shown as laminated springs or resilient leaf spring elements, or spring bundles, extending outwardly relatively to the hub and having their ends seated or secured in the recesses or sockets. These springs fit at like ends comparatively snugly in the recesses or sockets and are loose enough at their other ends to function during relative rotation within limits of the plate 1 and hub 4. The hub 4 extends at its ends beyond opposite sides of the disk, and the disk has at least one ring defining the opening therein for receiving the hub.

In the illustrated embodiment of my invention, the recesses or sockets and springs are normally arranged radially with respect to the axis of the hub.

7 designates the recesses in the hub, these being provided in an external annular flange 8 on the hub and being in the form of notches opening through opposite sides of the flange.

9 designates the recesses or sockets provided on the plate or disk 1, these sockets or recesses being usually formed by corrugations or offsets in an element 10 secured as by rivets 11 to one side of the disk 1.

This element 10 is a sheet metal ring lying flatwise on the plate or disk 1 with the corrugations at regular intervals. This ring 10 as well as the plate 1 is formed of sheet metal and the ring 10 stiffens the plate or disk 1. There are preferably a plurality of springs although, obviously, but one spring means may be used.

12 designates the springs each of which consists of a number of laminations fitting comparatively snugly at their inner ends in the recesses or notches 7. The springs are held from endwise displacement by lips 13 turned over on the outer end of the springs. The plate or disk 1 lies flatwise against one side of the flange 8 and encloses one side of each recess or notch 7. A closure disk or ring 14 lies flatwise against the other side of the flange 8 and closes each recess 7. This recess with its sides closed forms a socket for receiving the inner end of the spring 12. Laminated springs are used because the inherent characteristic of laminated springs is that the leaves or laminations, being separate pieces, have a relative slipping movement during the flexing of the laminations as the leaves are separable throughout their length from each other, or capable of slipping throughout their length relatively to each other, while being in frictional engagement.

The element or ring 10, formed with the corrugations in which the outer ends of the laminated springs extend, constitutes means connected to the disk and straddling the outer ends of the resilient elements, or laminated springs, and connecting the disk to said elements, or springs, which means is offset laterally from the plane of the disk and forms pockets for the outer ends of the laminated springs.

The flange 8 and disk 1 are held in position by fastening means as rivets 15 extending through the closure disk 14, the flange 8 and a ring 16 overlying the inner margin of the disk 1. In order that the disk 1 may be capable of a limited relative movement, it is formed at its inner margin with cut-outs or slots 17 through which the fastening means or rivets 15 extend. In order to prevent the ring 16 from clamping the inner margin of the disk, the hub is formed with a shoulder 18 at the base of the flange 8 against which the ring 16 thrusts and also the ring is prevented from clamping the margin of the disk 1 by spacing shoulders 19 on the rivets 15, the shoulders 19 thrusting against the flange 8.

In Figure 5, a complete clutch is shown in which A is the driving member, B the clutch shaft, C the throw-out collar, D the clutch spring, E the motion transmitting levers for transmitting movement of the throw-out collar and clutch spring to the pressure ring F which presses the disk against the driving member A or the bottom of the recess therein in which the driven member of the clutch is located.

In operation, during the transmission of the torque, the springs 12 are free to bend or yield slightly and thus cushion the torque either when the clutch is being let in, or during quick acceleration, or when the engine is being driven or cranked from the propeller shaft, that is when the clutch is let in while the vehicle is coasting. Furthermore the torque is cushioned during constantly varying resistances on the drive wheels of the vehicle resulting from obstructions and unevenness in the road.

This clutch member is particularly advantageous in that it is simple, compact and economical in construction and consists of a minimum number of parts.

What I claim is:

1. A clutch member for friction clutches comprising a hub having a peripheral flange formed with a recess, a plate mounted on the hub against said flange and closing one side of the recess, the plate being provided with an element on one side thereof formed with a recess enclosing a socket opening toward and alined with the recess in the flange of the hub, a closure member secured to the hub for closing the outer side of the recess in the flange, and spring means having their ends located respectively in said alined recesses.

2. A clutch member for friction clutches comprising a hub having a peripheral flange formed with a recess, a plate mounted on the hub against said flange and enclosing one side of the recess, the plate having an element on one side thereof formed with a corrugation enclosing a socket opening toward and alined with the recess in the flange of the hub, a closure member secured to the hub for closing the outer side of the recess in the flange, and spring means having their ends located respectively in said recesses.

3. A clutch member for friction clutches comprising a hub having a peripheral flange formed with a recess, a plate mounted on the hub and capable of limited movement about the same, the plate lying against one side of the flange and enclosing one side of the recess, the plate having a ring mounted on one side thereof formed with an offset corrugation enclosing a socket alined with the recess in said flange, a ring mounted on the hub enclosing the outer side of the recess in the flange and forming a socket on the hub, and spring means having its ends located in said sockets.

4. A clutch member for friction clutches comprising a hub formed with an external annular flange, a shoulder at the base of the flange, the flange being formed with a recess opening through its periphery and its sides, a plate mounted on the hub and lying against one side of the flange closing one side of the recess, the plate having a member mounted on one side thereof and having an offset corrugated portion providing a socket alined with the recess in the flange, a spring structure having its ends located in the socket and the recess, a ring mounted on the hub and abutting against said shoulder and lying against the inner margin of the plate, a second ring mounted on the hub and arranged to close the other side of the recess in the flange, fastening means extending through the first ring, the flange and the second ring having a spacing means for preventing the first ring from clamping the plate tightly against the flange.

5. In a friction clutch, a transmitting member comprising a hub, a friction ring, mounting means for the ring, a lost motion connection between the mounting means and the hub for holding the mounting means against axial displacement with respect to the hub, and a driving connection between said mounting means and said hub including a laminated spring normally extending radially relatively to the hub and the ring, the hub and the mounting having alined sockets and the spring being mounted in the socket of the hub and extending into the socket of the mounting, the laminations lying flatwise on each other in frictional engagement and fulcruming on opposite edges of the socket in the hub during flexing upon a relative torsional movement of the hub and the mounting.

6. A clutch construction including a hub, a disc mounted on the hub, means connecting the disc to the hub for rotary movement relative thereto and preventing axial displacement of the disc with respect to the hub, other connecting means between the disc and hub including a plurality of resilient elements mounted radially in the hub and projecting outwardly therefrom, and means connected to the disc and straddling the outer ends of said elements and connecting the disc to said elements.

7. A clutch construction including a hub, a disc mounted on the hub, means connecting the disc to the hub for rotary movement relative thereto and preventing axial displacement of the disc with respect to the hub, other connecting means between the disc and hub including a plurality of resilient elements mounted radially in the hub and projecting outwardly therefrom, and means on said disc offset from the plane thereof for straddling said elements and connecting them to the disc.

8. A clutch construction including a hub having an outwardly extending flange, the flange being formed with pockets therein opening through its periphery, a disc mounted on the hub, means connecting the disc to the hub for rotary movement relative thereto and preventing axial displacement of the disc with respect to the hub, other connecting means between the disc and hub including spring bundles mounted in the pockets and extending outwardly from the same, and means on the disc and extending out of the plane of the disc for forming pockets for receiving the outer ends of the spring bundles, said means extending laterally from the disc.

9. In a clutch, the combination of a hub, a disc mounted on the hub, the hub being provided with a flange formed with pockets open through its opposite sides and through its periphery, spring bundles mounted in the pockets and extending outwardly therefrom, means on the disc and offset from the plane thereof for straddling the outer ends of the bundles, and additional means for securing the disc to the hub for relative rotary movement and for preventing axial displacement of the disc with respect to the hub, said securing means also closing the sides of the pockets.

10. In a clutch, the combination of a hub, a disc mounted on the hub and concentric therewith, the hub being formed with pockets open at their outer ends, the pockets extending out of the plane of the disc, spring bundles mounted in the pockets and extending outwardly therefrom, means connecting the disc to the hub for rotary movement relative thereto and preventing axial displacement of the disc with respect to the hub, other connecting means between the disc and hub including means on the disc and extending out of the plane of the disc for receiving and straddling the outer ends of the bundles.

11. A transmitting element for use in a clutch which comprises a hub having a plurality of angularly spaced open recesses, a plurality of resilient leaf spring elements each having a portion seated in a recess and another portion lying exposed outside the recess, a disc having an opening through which the hub extends, said hub having its ends extending on opposite sides of said disc and said disc including at least one ring defining said opening and having recesses adjacent said opening and formed at least in part in said ring, there being a recess for each spring element in which recess the exposed portion of said spring element is received, means for securing the disc to the hub while permitting the hub and disc a limited degree of relative angular movement against the resistance of said spring elements, and friction material carried by said disc.

12. A transmitting element for use in a clutch which comprises a hub having angularly spaced recesses opening outwardly, leaf spring elements each seated at one end in one of said recesses and projecting outwardly beyond said recess, a disc having a central opening through which the hub extends, the hub having its ends extending on opposite sides of said disc and the disc having recesses adjacent said opening for receiving the outer ends of said spring elements, means securing the hub and disc together and preventing their complete separation while permitting them a limited degree of relative angular movement, said spring elements being flexed in and resisting said movement, and friction material carried by said disc.

13. A power transmitting element adapted to absorb and dampen vibrations received from a driving element which comprises a hub having a plurality of angularly spaced open recesses, a plurality of resilient leaf spring elements, each having a portion seated in a recess and another portion lying exposed outside the recess, a disk having an opening through which the hub extends, said hub having its ends extending on opposite sides of said disc and said disk being secured loosely to said hub to have a limited freedom of angular movement relative thereto and having recesses, each for receiving the exposed portion of a spring element, said spring elements resisting relative angular movement of the disk and hub, and means independent of said spring elements limiting the relative angular movement of the disk and hub.

CHARLES B. SPASE.